United States Patent [19]

Nishiyama et al.

[11] Patent Number: 4,954,314
[45] Date of Patent: Sep. 4, 1990

[54] METHOD AND APPARATUS FOR MANUFACTURING SYNTHETIC PRODUCTS

[75] Inventors: Yukio Nishiyama; Junzo Fujioka, both of Akashi; Haruki Hino; Yuji Matsuzaki, both of Kobe; Masayuki Sakiyama, Ono; Minoru Yokoyama, Akashi, all of Japan

[73] Assignee: Kawasaki Jukogyo Kabushiki Kaisha, Kobe, Japan

[21] Appl. No.: 476,544

[22] Filed: Feb. 7, 1990

[51] Int. Cl.$^5$ .................................................. B22F 3/00
[52] U.S. Cl. ....................................... 419/45; 419/28; 264/125
[58] Field of Search .................... 419/28, 45; 269/125

[56] References Cited

U.S. PATENT DOCUMENTS

| | | | |
|---|---|---|---|
| 4,655,830 | 4/1987 | Akashi et al. | 419/45 |
| 4,673,550 | 6/1987 | Dallaire et al. | 419/45 |
| 4,879,262 | 11/1989 | Halverson et al. | 419/45 |
| 4,906,295 | 3/1990 | Miyamoto et al. | 419/45 |

OTHER PUBLICATIONS

Nobuhiro Sata, "Manufacturing Functionally Gradient Material-Creation of Functionally Gradient Material by Self-Exthermic Reaction", Kino Zairyo (Functional Material), Feb. 1988, pp. 47–58.

*Primary Examiner*—Stephen J. Lechert, Jr.
*Attorney, Agent, or Firm*—Wenderoth, Lind & Ponack

[57] ABSTRACT

A plural number of types of material powders are accommodated in an accommodation chamber in a mixed state and the material powders are continuously subjected to a self-exothermic reaction inducing chemical reactions between the material powders caused by heat of reaction released when the mixed material powders synthesize. The synthesized material of high temperature due to the self-exothermic reaction is pressed by utilizing an electromagnetic force just after the finish of the self-exothermic reaction. The exothermic reaction is caused by an ignition circuit including an ignition electrode and the electromagnetic force is generated by an electromagnetic force generation circuit including an electric current inducing means. These circuits are connected through and regulated by a relay circuit. Thus the synthetic products of fine structure are obtained.

3 Claims, 1 Drawing Sheet

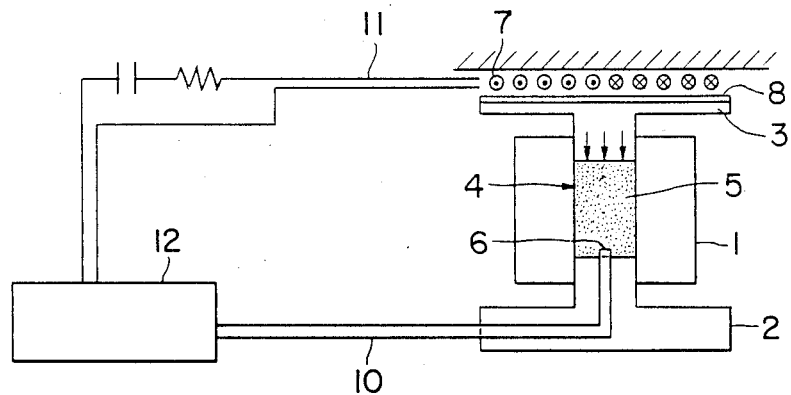
F I G. 1
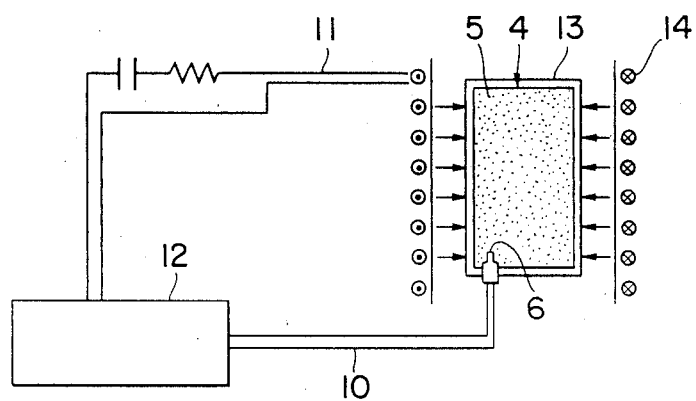
F I G. 2

METHOD AND APPARATUS FOR MANUFACTURING SYNTHETIC PRODUCTS

BACKGROUND OF THE INVENTION

The present invention relates to a method and apparatus for manufacturing synthetic products by the utilization of a self-exothermic reaction.

A self-exothermic reaction is known as a method of synthesizing ceramics and intermetallic compounds as disclosed, for example, in "KINO ZAIRYO (Functional Material)", published in February, 1988, pages 47 to 58. The method disclosed is a material synthesizing method in which chemical reactions are positively and effectively utilized. In the method, chemical reactions of adjacent portions are continuously caused in a self-propagating manner by heat of reaction released at the material synthesizing time and the entire synthesizing operation in a synthesizing system is initiated by local ignition.

In a conventional synthetic product manufacturing method utilizing the method of the character described above, an HIP (Hot Isostatic Pressing) equipment or a spring pressure applying equipment is utilized for carrying out self-exothermic reaction under pressure.

However, the HIP equipment is very costly and the treatment or procedure by the utilization of the HIP equipment requires much manual labor, thus being inconvenient and troublesome, which results in cost increases of the synthetic products. In addition, in a case where the final synthetic product is produced by the utilization of self-exothermic reaction, an environmental pressure higher than that obtained by the HIP equipment is sometimes required, but conventional HIP equipments can hardly satisfy this requirement.

SUMMARY OF THE INVENTION

An object of the present invention is to substantially eliminate the defects and drawbacks encountered in the prior art described above and to provide a method and apparatus for manufacturing synthetic products by utilizing an electromagnetic force to press a material just after finishing the self-exothermic reaction.

This and other objects can be achieved according to the present invention, in one aspect, by providing a method of manufacturing synthetic products comprising the steps of mixing plural kinds of material powders, causing a self-exothermic reaction continuously inducing chemical reactions between the material powders caused by heat of reaction released when the mixed material powders are synthesized, and pressing the synthesized material of high temperature by utilizing an electromagnetic force just after the finish of the self-exothermic reaction.

In another aspect, according to the present invention, the described objects can be achieved by providing an apparatus for manufacturing synthetic products comprising a mixed material powder accommodation means, an ignition means having at least a partial portion which is disposed into the mixed material powders in the accommodation means and adapted to initiate a self-exothermic reaction of the mixed material powders, and an electromagnetic force applying means for pressing the mixed material powders at a time just after the finish of the self-exothermic reaction, the pressing of the mixed material powders being carried out by utilization of electromagnetic force.

According to the present invention of the character described above, plural kinds of material powders accommodated in an accommodation chamber are subjected to a self-exothermic reaction continuously inducing chemical reactions between the material powders caused by heat of reaction released at a synthesizing time of the mixed material powders and the synthesized material of high temperature due to the self-exothermic reaction are pressed by utilizing an electromagnetic force just after the finish of the self-exothermic reaction. The exothermic reaction is caused by an ignition circuit including an ignition electrode and the electromagnetic force is generated by an electromagnetic force generation circuit including an electric current inducing means. These circuits are connected through and regulated by a relay circuit.

Accordingly, the self-exothermic reaction can be achieved under a high pressure which is not applied in the prior art technology, so that a large and complex synthetic molding product can be obtained, and the quality of the product can be improved. Therefore, the usage of the synthetic product thus produced can be utilized in various recent technical fields with reduced cost.

BRIEF DESCRIPTION OF THE DRAWINGS

FIG. 1 is a schematic view of a first embodiment of an apparatus for manufacturing synthetic products according to the present invention; and FIG. 2 is also a schematic view of a second embodiment of an apparatus according to the present invention.

DESCRIPTION OF THE PREFERRED EMBODIMENTS

A preferred embodiment of the present invention will become understood from the following detailed description referring to the accompanying drawings.

FIG. 1 shows a first embodiment of an apparatus for carrying out a synthetic product manufacturing method according to the present invention. Referring to FIG. 1, a plural number of types of material powder 5 are packed in an accommodation chamber 4 in a mixed state. The accommodation chamber 4 is defined by a space enclosed with a cylindrical mold 1, a stationary punch 2, and a movable punch 3.

An ignition electrode 6 is arranged in the accommodation chamber 4 at a portion suitable for locally igniting the mixed powders 5. Thus a self-exothermic reaction is caused and propagated in a short time in a self-propagating manner by heat of reaction caused at the time of synthesis of the material powders in the chamber 4 and the entire synthesizing system can be composed. The synthesized material of high temperature obtained by the exothermic reaction of the material powders 5 is pressed by the electromagnetic force at a time just after the finish of the self-exothermic reaction of the material powder, thereby producing a synthetic product with a fine structure.

An ignition circuit 10 including the ignition electrode 6 and an electromagnetic force generation circuit 11 are connected in series through a relay circuit 12. The electromagnetic generation circuit 11 includes a flat coil means 7. An eddy current is induced by the magnetic field caused to a pressure receiving plate 8 disposed adjacent to the flat coil 7 by conducting an electric current through the flat coil 7. At this moment, the Lorentz's force is generated and is imparted to the pressure receiving plate 8. Thus the movable punch 3 is moved by this Lorentz's force. According to the movement of the movable punch 3, a predetermined pressure is applied to the synthesized material obtained by the self-exothermic reaction of the material powders 5 in the accommodation chamber 4. This pressure application timing for the synthesized material and the ignition timing of the ignition circuit 10 are regulated in an exact and pertinent manner by the operation of the relay circuit 12.

FIG. 2 shows a schematic view of a second embodiment of an apparatus for carrying out the method according to the present invention.

Referring to FIG. 2, the material powders 5 in the mixed state are packed in a cylindrical capsule 4 formed by a sheath member 13 of a well-conducting thin plate made of such as silver or copper. The capsule 4 is arranged inside a cylindrical solenoid coil 14 which constitutes one element of an electromagnetic force generation circuit 11.

With this second embodiment, a plural number of types of material powders 5 are accommodated in the capsule 4 in the mixed state and the mixed material powders 5 are ignited locally by the operation of an ignition electrode 6 installed in the capsule 4, whereby the self-exothermic reaction is caused and propagated in a self-propagating manner in an extremely short time thereby synthesizing the entire materials. Then, the synthesized material of high temperature obtained by the self-exothermic reaction of the material powders 5 is pressed by the electromagnetic force at a time just after the finish of the self-exothermic reaction, thereby producing a synthetic product of fine structure.

When an induction current is caused to the sheath 13 by conducting an electric current to the solenoid coil 14, a repulsion force is generated between the solenoid coil 14 and the sheath 13, whereby the sheath 13 is subjected to an inward force which acts, as a predetermined pressure, on the synthesized material in a high temperature state obtained by the self-exothermic reaction of the material powders 5. In this embodiment, the ignition circuit 10 and the electromagnetic force generation circuit 11 are also connected in series through the relay circuit 12. Accordingly, the ignition timing of the ignition circuit 10 to the material powders 5 and the pressure applying timing for the synthesized material can be exactly regulated as described with reference to the first embodiment as shown in FIG. 1.

It was found by comparison of the first and second embodiments that the second embodiment attains an energy efficiency for the electromagnetic force generation higher than that attained by the first embodiment, with the energy efficiency of the first embodiment reaching 5 to 6%, and that of the second embodiment reaching 50%.

In a modification of the second embodiment, the sheath 13 may be arranged outside the solenoid coil 14, and in this modification, the synthesized material will be pressed in an outward direction which is opposite to the direction of the arrows indicated in FIG. 2. The ignition electrode may also be arranged at a central portion of the material powders.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A method of manufacturing synthetic products comprising the steps of:
    mixing a plural number of types of material powders;
    causing a self-exothermic reaction continuously inducing chemical reactions between the material powders caused by heat of reaction released when the mixed material powders synthesize; and
    pressing the synthesized material at high temperature by utilizing an electromagnetic force just after the finish of the self-exothermic reaction.

2. The method according to claim 1, wherein said self-exothermic reaction is initiated and then propagated by local ignition of the mixed material powders.

3. The method according to claim 2, wherein said ignition is initiated at substantially the central portion of the mixed material powders.

* * * * *